United States Patent [19]
Tatsuno

[11] Patent Number: 5,402,268
[45] Date of Patent: Mar. 28, 1995

[54] TELEPHOTO LENS SYSTEM ALLOWING SHORT-DISTANCE PHOTOGRAPHING OPERATION

[75] Inventor: Wataru Tatsuno, Yokohama, Japan

[73] Assignee: Nikon Corporation, Tokyo, Japan

[21] Appl. No.: 209,369

[22] Filed: Mar. 14, 1994

Related U.S. Application Data

[63] Continuation of Ser. No. 49,339, Apr. 21, 1993, abandoned.

[30] Foreign Application Priority Data

May 18, 1992 [JP] Japan .................. 4-124480

[51] Int. Cl.⁶ .............................. G02B 13/02
[52] U.S. Cl. .................. 359/747; 359/685; 359/686; 359/745; 359/779
[58] Field of Search ............... 359/745–747, 359/779, 683, 685, 686, 693

[56] References Cited

U.S. PATENT DOCUMENTS 4,437,734  3/1984  Iizuka .................... 359/745
4,508,433  4/1985  Kitagishi et al. ........ 359/745
4,904,070  2/1990  Hirakawa ............... 359/747

FOREIGN PATENT DOCUMENTS 61-132916  6/1986  Japan .
2-81014  3/1990  Japan .

Primary Examiner—Scott J. Sugarman
Assistant Examiner—James Phan
Attorney, Agent, or Firm—Shapiro and Shapiro

[57] ABSTRACT

A micro lens allowing a short-distance photographing operation from infinity to an equal magnification consists of, in order from the object side, a first lens group including a negative lens and having a positive refracting power, a second lens group having a positive refracting power, a third lens group including a cemented lens (doublet lens) and having a negative refracting power, and a fourth lens group having a positive refracting power. When a focusing operation is performed from infinity to a short distance, the first lens group is nonlinearly moved and the group interval between the second and third lens groups is increased, thereby satisfying required conditions.

17 Claims, 2 Drawing Sheets

TELEPHOTO LENS SYSTEM ALLOWING SHORT-DISTANCE PHOTOGRAPHING OPERATION

This is a continuation of application Ser. No. 049,339, filed Apr. 21, 1993, now abandoned.

BACKGROUND OF THE INVENTION

1. Field of the Invention

The present invention relates to a telephoto lens system and, more particularly, to a telephoto lens system allowing a short-distance photographing operation from infinity to an equal magnification.

2. Related Background Art

Conventionally, in order to perform a close-up photographing operation up to a magnification near an equal magnification, a system for increasing the extension amount of a photographing lens using a close-up member such as bellows is adopted, and such a photographing system is known to those who are skilled in the art. However, this system requires a cumbersome assembling operation, and is inconvenient for carrying. In addition, the extension amount becomes considerably large, resulting in insufficient performance. With recent spread of AF cameras comprising auto-focusing devices, demand has arisen for a decrease in work load as a product of the weight and the moving amount of a lens group, which is moved to attain an in-focus state. In order to quickly perform a focusing operation, and to prevent deterioration of image formation performance caused by the focusing operation in a short-distance photographing operation, a so-called telephoto macro lens adopting an internal focusing system or a floating system is proposed in, e.g., U.S. Pat. No. 4,437,734, Japanese Laid-Open Patent Application No. 2-81014, U.S. Pat. No. 4,508,433, Japanese Laid-Open Patent Application No. 61-132916, and the like.

In a telephoto lens system disclosed in U.S. Pat. No. 4,437,734 assigned to the owner of the present invention, since a first lens group at the most object side is fixed in position, advantages, e.g., no change in total length, and very small movement of the center of gravity can be expected. In this telephoto lens system, however, the focal length in an infinity arrangement is as relatively short as 162 mm or less, and a variation in astigmatism in an in-focus state is large. In addition, although this telephoto lens system realizes a photographing range from infinity to an equal magnification, a considerable aberration is generated near a ½ magnification (middle focal length range).

In a telephoto lens system disclosed in Japanese Laid-Open Patent Application No. 2-81014 assigned to the owner of the present invention, most of the problems of the above-mentioned patent are solved, but a problem of a large distortion in an equal magnification photographing operation remains unsolved. In a telephoto lens system disclosed in U.S. Pat. No. 4,508,433, the focal length in the infinity arrangement is as short as about 100 mm, and a change in total length and a work load in a focusing operation are large. Furthermore, a problem of a large variation in spherical aberration remains unsolved.

A telephoto lens system disclosed in Japanese Laid-Open Patent Application No. 61-132916 has a short total length to the focal plane and a focal length of about 200 mm in the infinity arrangement, and causes a relatively small variation in aberration. However, since this telephoto lens system adopts a focusing system for extending a first lens group at the most object side, which is constituted by a large number of lenses and is heavy, it suffers from a large change in total length, a large movement of the center of gravity, and a large work load in a focusing operation from infinity to a short distance.

SUMMARY OF THE INVENTION

The present invention has been made in consideration of the conventional problems, and has as an object to provide a telephoto lens system, which can minimize the movement of the center of gravity of the lens, can improve operability by assuring a large working distance, suffers from less distortion, has good image formation performance from infinity to a short distance at an equal magnification, and has a focal length of about 200 mm in an infinity arrangement.

In order to achieve the above object, a telephoto lens system according to the present invention includes, in order from an object side, a first lens group which has a positive refracting power and is movable for a focusing operation, a second lens group which has a positive refracting power and is fixed in position in the focusing operation, a third lens group which has a negative refracting power and is movable for the focusing operation, and a fourth lens group which has a positive refracting power and is fixed in position in the focusing operation, wherein in a focusing operation from infinity to a short distance, the first lens group is moved toward the object side along a convex nonlinear path so as to change a group interval from the second lens group, and the third lens group is moved as well to change a group interval from the second lens group. Thus, the telephoto lens system allowing a short-distance photographing operation, in which various aberrations from infinity to a short distance at which a photographing magnification is large can be satisfactorily corrected, and which has good image formation performance, can be provided.

In order to shorten the total length, the first and second lens groups preferably satisfy the following condition:

$$1 < f_2/f_1 < 3$$

where
$f_1$: the focal length of the first lens group
$f_2$: the focal length of the second lens group It is preferable that the first lens group consists of a plurality of lenses having at least a negative lens at the most object side, and has a positive refracting power as a whole. It is also preferable that the third lens group consists of a plurality of lenses including a cemented negative lens (doublet lens), and has a negative refracting power as a whole. Furthermore, the first and third lens groups preferably satisfy the following conditions:

$$-3 < f_A/f_1 > -1.4$$

$$0.5 < r_a/\{F(n_b - n_c)\} < 1.0$$

where
$f_1$: the focal length of the first lens group
$f_A$: the focal length of the negative lens located at the most object side in the first lens group
$F$: the focal length of the entire system in the infinity arrangement $r_a$: the radius of curvature of the cemented surface of the cemented negative lens at the most object side in the third lens group (i.e., lens surfaces of lenses constituting a doublet lens with the lens surfaces facing toward each other)

$n_a$: the refractive index of an object-side lens constituting a portion of the cemented negative lens at the most object side in the third lens group $n_b$: the refractive index of an image-side lens constituting another portion of the cemented negative lens at the most object side in the third lens group As described above, in the telephoto lens system according to the present invention, in a focusing operation from infinity to a short distance, the group interval between the second and third lens groups is increased, and the first lens group is moved to nonlinearly change the group interval between the first and second lens groups. When the focusing operation is performed by moving the third lens group alone, if a variation in astigmatism caused by the focusing operation is suppressed, a spherical aberration in a middle focal length range is considerably over-corrected. However, when the first lens group is moved toward the object side, the correction of the spherical aberration can be suppressed. Thus, in the telephoto lens system according to the present invention, the first lens group is nonlinearly moved to properly correct the spherical aberration.

As described above, in a telephoto lens system disclosed in Japanese Laid-Open Patent Application No. 2-81014, a first lens group located at the most object side is divided into two groups, and the two divided groups are moved relative to each other, so that the group interval therebetween is nonlinearly changed, thereby relatively satisfactorily correcting generation of aberrations in the middle focal length range at a large photographing magnification, which is unique to this lens type. However, even in this known telephoto lens system, a spherical aberration cannot be satisfactorily corrected. Thus, in the telephoto lens system according to the present invention, in order to suppress generation of various aberrations in the middle focal length range while suppressing generation of a spherical aberration, the interval from a lens surface at the most object side to a lens surface at the most image side in the fourth lens group is set to be large, thereby controlling the exit direction of principal rays of peripheral light beams. Thus, satisfactory aberration correction can be done over the entire photographing range.

Other objects, features, and effects of the present invention will become sufficiently apparent from the following detailed description taken in conjunction with the accompanying drawings.

DESCRIPTION OF THE PREFERRED EMBODIMENTS

The preferred embodiments of the present invention will be described in detail hereinafter with reference to the accompanying drawings.

Figure 1:
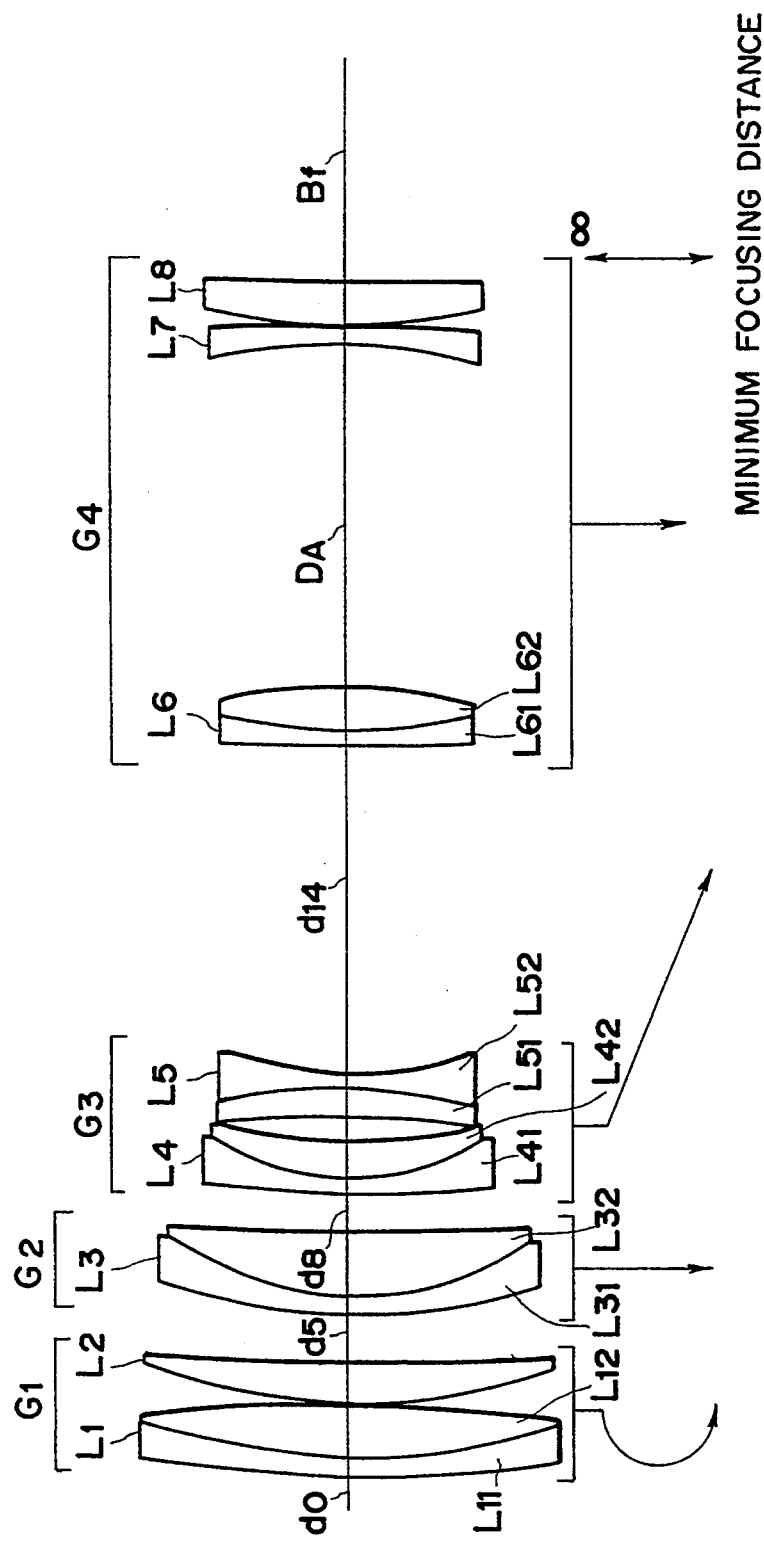
FIG. 1 is a schematic lens diagram showing the lens arrangement and moving states of lens groups in a focusing operation according to the first embodiment of the present invention.
Figure 2:
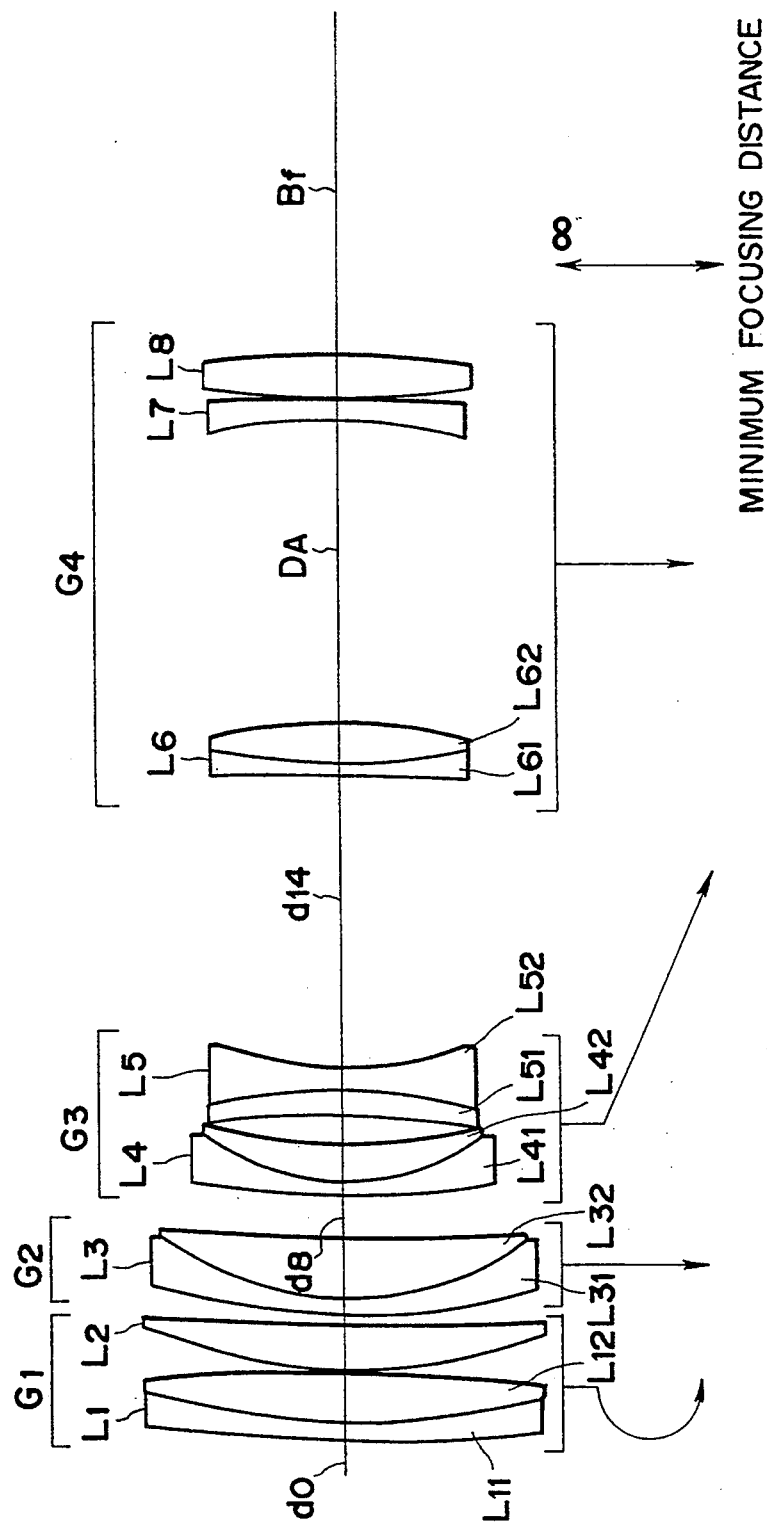
FIG. 2 is a schematic lens diagram showing the lens arrangement and moving states of lens groups in a focusing operation according to the second embodiment of the present invention.

FIGS. 1 and 2 are lens diagrams showing the first and second embodiments of the present invention. In either of FIGS. 1 or 2, a telephoto lens system consists of, in order from the object side, a first lens group $G_1$ which has a positive refracting power and is movable for a focusing operation, a second lens group $G_2$ which has a positive refracting power and is fixed in position in the focusing operation, a third lens group $G_3$ which has a negative refracting power and is movable for the focusing operation, and a fourth lens group $G_4$ which has a positive refracting power and is fixed in position in the focusing operation. In a focusing operation from infinity to a short distance, the first lens group $G_1$ is moved toward the object side along a convex nonlinear path to change a group interval from the second lens group $G_2$, and the third lens group $G_3$ is movable to increase the group interval from the second lens group $G_2$.

Furthermore, the first lens group $G_1$ consists of a cemented positive lens (doublet lens) $L_1$ having a negative lens $L_{11}$ at the most object side and a positive lens $L_{12}$, and a positive lens $L_2$, and has a positive refracting power as a whole. The second lens group $G_2$ consists of a cemented positive lens (doublet lens) $L_3$ having a negative lens $L_{31}$ and a positive lens $L_{32}$. The third lens group $G_3$ is constituted by a cemented negative lens (doublet lens) $L_4$ having a negative lens $L_{41}$ and a positive lens $L_{42}$, and a cemented negative lens (doublet lens) $L_5$ having positive and negative lenses. The fourth lens group $G_4$ consists of a cemented positive lens (doublet lens) $L_6$ having a negative lens $L_{61}$ and a positive lens $L_{62}$, a negative lens $L_7$, and a positive lens $L_8$, and has a positive refracting power as a whole.

Moreover, the first, second, and third lens groups $G_1$, $G_2$, and $G_3$ are arranged to satisfy the following conditions:

$$1 < f_2/f_1 < 3 \tag{1}$$

$$-3 < f_4/f_1 < -1.4 \tag{2}$$

$$0.5 < r_a/\{F(n_b - n_a)\} < 1.0 \tag{3}$$

where $f_1$: the focal length of the first lens group $G_1$ $f_2$: the focal length of the second lens group $G_2$ $f_4$: the focal length of the negative lens $L_{11}$ located at the most object side in the first lens group $G_1$ $F$: the focal length of the entire system in the infinity arrangement $r_a$: the radius of curvature of the cemented surface of the cemented lens $L_4$ at the most object side in the third lens group $G_3$ (i.e., lens surfaces of lenses constituting a doublet lens with the lens surfaces facing toward each other)

$n_a$: the refractive index of the object-side lens $L_{41}$ constituting a portion of the cemented lens $L_4$ at the most object side in the third lens group $G_3$ $n_b$: the refractive index of the image-side lens $L_{42}$ constituting another portion of the cemented lens $L_4$ at the most object side in the third lens group $G_3$.

The above-mentioned conditions in the present invention will be described in detail below.

The condition (1) defines a proper ratio of the focal lengths of the first and second lens groups $G_1$ and $G_2$. If the ratio exceeds the upper limit of the condition (1), since the refracting power of the first lens group $G_1$ becomes strong, it becomes difficult to correct, e.g., a spherical aberration. Conversely, if the ratio is set below the lower limit of the condition (1), the total length becomes undesirably large although such a ratio is advantageous for aberration correction.

The condition (2) defines a proper ratio of the focal lengths of the negative lens $L_{11}$ at the most object side in the first lens group $G_1$ and the first lens group $G_1$. If the ratio exceeds the upper limit of the condition (2), the refracting power of the negative lens $L_{11}$ becomes too strong to correct, e.g., a spherical aberration. Conversely, if the ratio is set below the lower limit of the condition (2), the refracting power of the negative lens $L_{11}$ becomes too weak to correct a spherical aberration and a chromatic aberration.

The condition (3) defines an optimal surface refracting power of the cemented surface of the cemented lens $L_4$ at the most object side in the third lens group $G_3$. If the refracting power exceeds the upper limit of the condition (3), since the surface refracting power of the cemented surface becomes weak, a proper Petzval's sum cannot be maintained, and it becomes difficult to correct an astigmatism. Conversely, when the refracting power is set below the lower limit of the condition (3), the surface refracting power of the cemented surface becomes too strong to correct a spherical aberration.

In order to more satisfactorily correct aberrations, the fourth lens group $G_4$ is arranged to satisfy the following conditions:

$$-7 < r_b/\{F(n_d - n_c)\} < -2 \qquad (4)$$

$$0.05 < D_A/F < 0.35 \qquad (5)$$

where

F: the focal length of the entire system in the infinity arrangement $r_b$: the radius of curvature of the cemented surface of the cemented lens $L_6$ in the fourth lens group $G_4$ (i.e. lens surfaces of lenses constituting a doublet lens with the lens surfaces facing toward each other)

$n_c$: the refractive index of the object-side lens $L_{61}$ constituting a portion of the cemented lens $L_6$ in the fourth lens group $G_4$ $n_d$: the refractive index of the image-side lens $L_{62}$ constituting another portion of the cemented lens $L_6$ in the fourth lens group $G_4$ $D_A$: the axial air interval between the cemented lens $L_6$ and the lens $L_7$ located at the image side of the cemented lens $L_6$ in the fourth lens group $G_4$.

The condition (4) defines an optimal surface refracting power of the cemented surface of the cemented lens $L_6$ in the fourth lens group $G_4$. If the refracting power exceeds the upper limit of the condition (4), the surface refracting power of the cemented surface becomes too strong to correct a spherical aberration at the minimum focusing distance side having a small correction margin. Conversely, when the refracting power is set below the lower limit of the condition (4), since the surface refracting power of the cemented surface becomes too weak, a correction effect for oblique rays is reduced, and it becomes difficult to correct, e.g., an astigmatism.

The condition (5) defines an optimal air interval along the optical axis from the cemented lens $L_6$ to the next lens $L_7$ in the fourth lens group $G_4$. If the interval exceeds the upper limit of the condition (5), since the air interval $D_A$ is prolonged, a correction effect for oblique rays becomes strong, and such an interval is preferable in terms of aberration correction. However, such an interval is not preferable since it leads to an increase in diameter of the lens $L_8$ at the most image side, and it becomes difficult to assure a back focus. Conversely, if the interval is set below the lower limit of the condition (5), since the air interval $D_A$ becomes short, a correction effect for oblique rays is reduced, and in particular, such an interval is not preferable since it becomes difficult to satisfactorily correct a distortion as one of problems to be solved by the present invention.

Moreover, in order to correct a variation in aberration in the focusing operation and to realize a compact lens system, the third and fourth lens groups $G_3$ and $G_4$ are preferably arranged to satisfy the following conditions:

$$1.3 < f_{1,2}/|f_3| < 2.2 \qquad (6)$$

$$1.5 < f_4/|f_3| < 2.7 \qquad (7)$$

where $f_{1,2}$: the synthesized focal length of the first and second lens groups $G_1$ and $G_2$ in the infinity arrangement $f_3$: the focal length of the third lens group $G_3$ $f_4$: the focal length of the fourth lens group $G_4$.

The condition (6) defines a preferable ratio of the synthesized focal length $f_{1,2}$ of the first and second lens groups $G_1$ and $G_2$ to the focal length of the third lens group $G_3$ in the infinity arrangement. If the ratio exceeds the upper limit of the condition (6), the synthesized refracting power of the first and second lens groups $G_1$ and $G_2$ becomes too weak, and the refracting power of the fourth lens group $G_4$ becomes too strong to obtain a desired focal length of the entire system in the infinity arrangement. For these reasons, it becomes difficult to correct, e.g., a spherical aberration. Conversely, if the ratio is set below the lower limit of the condition (6), the refracting power of the fourth lens group $G_4$ must be weakened so as to obtain a desired focal length of the entire system in the infinity arrangement, although such a ratio is advantageous for correcting various aberrations. For this reason, the total length becomes undesirably large.

The condition (7) defines a preferable ratio of the focal lengths of the fourth and third lens groups $G_4$ and $G_3$. If the ratio exceeds the upper limit of the condition (7), since the refracting power of the fourth lens group $G_4$ becomes too weak, the synthesized refracting power of the first and second lens groups $G_1$ and $G_2$ becomes too strong to obtain a desired focal length of the entire system, and it becomes difficult to correct a variation in aberration in a focusing operation. Conversely, if the ratio is set below the lower limit of the condition (7), it is advantageous for correcting a variation in aberration in the focusing operation. However, since the refracting power of the third lens group $G_3$ becomes weak, the moving amount of the third lens group $G_3$ is increased in the focusing operation from the infinity to a short distance in an equal magnification photographing operation. For this reason, such a ratio is not preferable to shorten the total length of the lens system. Also, when this system is applied to an AF camera, such a ratio is not preferable since the work load is increased.

The lens arrangements of the first and second embodiments will be described in more detail below.

In the first embodiment of the present invention, in order from the object side, as shown in FIG. 1, a first lens group $G_1$ having a positive refracting power consists of a cemented positive lens (doublet lens) $L_1$ having a negative meniscus lens $L_{11}$ with a convex surface facing the object side and a double-convex positive lens $L_{12}$, and a positive meniscus lens $L_2$ with a convex surface facing the object side. A second lens group $G_2$ having a positive refracting power consists of a cemented positive lens (doublet lens) $L_3$ having a negative meniscus lens $L_{31}$ with a convex surface facing the object side and a positive meniscus lens $L_{32}$ with a convex surface facing the object side. Furthermore, a third lens group $G_3$ having a negative refracting power consists of a meniscus-shaped cemented negative lens (doublet lens) $L_4$ having a negative meniscus lens $L_{41}$ with a convex surface facing the object side and a positive meniscus lens $L_{42}$ with a convex surface facing the object side, and a double-concave-shaped cemented negative lens (doublet lens) $L_5$ having a positive meniscus lens $L_{51}$ with a convex surface facing the image side and a double-concave negative lens $L_{52}$. A fourth lens group $G_4$ having a positive refracting power consists of a cemented positive lens (doublet lens) $L_6$ having a negative meniscus lens $L_{61}$ with a convex surface facing the object side and a double-convex positive lens $L_{62}$, a negative meniscus lens $L_7$ with a convex surface facing the image side, and a positive meniscus lens $L_8$ with a convex surface facing the object side.

In the second embodiment shown in FIG. 2, in order from the object side, a first lens group $G_1$ having a positive refracting power consists of a cemented positive lens (doublet lens) $L_1$ having a negative meniscus lens $L_{11}$ with a convex surface facing the object side and a double-convex positive lens $L_{12}$, and a positive meniscus lens $L_2$ with a convex surface facing the object side. A second lens group $G_2$ having a positive refracting power consists of a cemented positive lens (doublet lens) $L_3$ having a negative meniscus lens $L_{31}$ with a convex surface facing the object side and a positive meniscus lens $L_{32}$ with a convex surface facing the object side. Furthermore, a third lens group $G_3$ having a negative refracting power consists of a meniscus-shaped cemented negative lens (doublet lens) $L_4$ having a negative meniscus lens $L_{41}$ with a convex surface facing the object side and a positive meniscus lens $L_{42}$ with a convex surface facing the object side, and a double-concave-shaped cemented negative lens (doublet lens) $L_5$ having a positive meniscus lens $L_{51}$ with a convex surface facing the image side and a double-concave negative lens $L_{52}$. A fourth lens group $G_4$ having a positive refracting power consists of a cemented positive lens (doublet lens) $L_6$ having a double-concave negative lens $L_{61}$ and a double-convex positive lens $L_{62}$, a double-concave negative lens $L_7$, and a double-convex positive lens $L_8$.

In both the embodiments, in a focusing operation from infinity to a short distance at an equal magnification, as shown in FIGS. 1 and 2, the first lens group $G_1$ having a positive refracting power is moved toward the object side to define a convex nonlinear path, so that the air interval from the second lens group $G_2$ is nonlinearly changed, and the third lens group $G_3$ having a negative refracting power is moved toward the image side to increase the group interval from the second lens group $G_2$, while the second and fourth lens groups $G_2$ and $G_4$ each having a positive refracting power are fixed in position.

Tables 1 and 2 below respectively summarize the specification values of the first and second embodiments. In each table, the numeral in the leftmost column indicates an order from the object side, r is the radius of curvature of the lens surface, d is the lens surface interval, v is the Abbe's number, n is the refracting power for a d-line ($\lambda = 587.6$ nm), $2\omega$ is the field angle, $\beta$ is the photographing magnification, Bf is the back focus, and $d_0$ is the distance from the object to the apex of the first lens surface.

TABLE 1

(First Embodiment)
$f = 200.0$ mm, f-number: 4.0, $2\omega = 12.33°$

| | r | d | v | n | |
|---|---|---|---|---|---|
| 1 | 197.971 | 2.50 | 33.9 | 1.80384 | $L_1$ |
| 2 | 85.604 | 7.00 | 82.6 | 1.49782 | |
| 3 | −206.085 | 0.30 | | | |
| 4 | 71.626 | 6.00 | 82.6 | 1.49782 | $L_2$ |
| 5 | 432.817 | 6.64 | | | |
| 6 | 79.137 | 2.50 | 40.9 | 1.79631 | $L_3$ |
| 7 | 39.959 | 8.80 | 60.7 | 1.60311 | |
| 8 | 484.258 | 5.14 | | | |
| 9 | 196.475 | 2.00 | 57.0 | 1.62280 | $L_4$ |
| 10 | 31.414 | 5.00 | 33.9 | 1.80384 | |
| 11 | 62.330 | 3.70 | | | |
| 12 | −105.523 | 4.00 | 25.4 | 1.80518 | $L_5$ |
| 13 | −59.020 | 2.00 | 60.1 | 1.62041 | |
| 14 | 49.151 | 45.12 | | | |
| 15 | 1213.454 | 2.00 | 31.1 | 1.68893 | $L_6$ |
| 16 | 69.615 | 6.00 | 60.1 | 1.62041 | |
| 17 | −59.143 | 46.50 | | | |
| 18 | −72.715 | 2.50 | 49.4 | 1.77279 | $L_7$ |
| 19 | −436.246 | 0.40 | | | |
| 20 | 86.920 | 6.00 | 45.9 | 1.54814 | $L_8$ |
| 21 | 815.561 | (Bf) | | | |

(Variable Interval in Zooming)
$f = 200.1499$ $\beta = -0.5000$ $\beta = -1.0000$

| | | | |
|---|---|---|---|
| $d_0$ | 0.0000 | 480.7237 | 272.5885 |
| $d_5$ | 6.6432 | 14.2044 | 6.6432 |
| $d_8$ | 5.1405 | 17.7426 | 37.1142 |
| $d_{14}$ | 45.1242 | 32.5222 | 13.1506 |
| Bf | 58.9638 | 58.9638 | 58.9638 |

The condition correspondence numeral values in this embodiment are as follows:

(1) $f_2/f_1 = 2.12$
(2) $f_4/f_1 = -1.65$
(3) $r_a/\{F(n_b - n_a)\} = 0.87$
(4) $r_b/\{F(n_d - n_c)\} = -5.08$
(5) $D_A/F = 0.23$
(6) $f_{1,2}/|f_3| = 1.67$
(7) $f_4/|f_3| = 2.50$.

TABLE 2

(Second Embodiment)
$f = 200.00$ mm, f-number: 4.0, $2\omega = 12.33°$

| | r | d | v | n | |
|---|---|---|---|---|---|
| 1 | 219.515 | 2.50 | 33.9 | 1.80384 | $L_1$ |
| 2 | 95.411 | 7.00 | 82.6 | 1.49782 | |
| 3 | −215.817 | 0.30 | | | |
| 4 | 72.028 | 6.00 | 82.6 | 1.49782 | $L_2$ |
| 5 | 515.631 | 1.00 | | | |
| 6 | 82.825 | 2.50 | 39.8 | 1.86994 | $L_3$ |
| 7 | 39.674 | 8.00 | 55.6 | 1.69680 | |
| 8 | 229.416 | 5.99 | | | |
| 9 | 118.583 | 2.00 | 54.0 | 1.61720 | $L_4$ |
| 10 | 29.047 | 5.00 | 33.9 | 1.80384 | |
| 11 | 57.872 | 4.00 | | | |
| 12 | −123.385 | 4.00 | 33.9 | 1.80384 | $L_5$ |
| 13 | −62.418 | 3.00 | 60.0 | 1.64000 | |
| 14 | 46.398 | 39.63 | | | |
| 15 | −17676.956 | 2.00 | 32.2 | 1.67270 | $L_6$ |
| 16 | 87.569 | 6.00 | 65.4 | 1.60300 | |
| 17 | −56.202 | 41.50 | | | |
| 18 | −61.913 | 2.50 | 52.3 | 1.74810 | $L_7$ |
| 19 | 7559.136 | 0.40 | | | |

TABLE 2-continued (Second Embodiment)
f = 200.00 mm, f-number: 4.0, 2ω = 12.33°

| 20 | 111.209 | 6.00 | 49.0 | 1.53172 | $L_8$ |
|---|---|---|---|---|---|
| 21 | −121.521 | (Bf) | | | |

(Variable Interval in Zooming)

| f = 199.9915 | β = −0.5000 | β = −1.0000 | |
|---|---|---|---|
| $d_0$ | 0.0000 | 483.5721 | 278.4238 |
| $d_5$ | 0.9970 | 6.7871 | 0.9970 |
| $d_8$ | 5.9902 | 20.4654 | 40.6025 |
| $d_{14}$ | 39.6330 | 25.1578 | 5.0208 |
| Bf | 70.5371 | 70.5371 | 70.5371 |

The condition correspondence numeral values in this embodiment are as follows:

(1) $f_2/f_1 = 2.64$
(2) $f_A/f_1 = -1.82$
(3) $r_a/\{F(n_b - n_a)\} = 0.78$
(4) $r_b/\{F(n_d - n_c)\} = -6.28$
(5) $D_A/F = 0.21$
(6) $f_{1,2}/|f_3| = 1.60$
(7) $f_4/|f_3| = 2.40$.

According to the present invention, the movement of the center of gravity of the lens system can be minimized while suppressing a change in total length of the lens system caused by a short-distance photographing operation, a relatively long working distance can be assured, and operability can be improved. In addition, a telephoto lens, which has very good image formation performance from an infinity distance to a short distance, and in which a distortion is satisfactorily corrected, can be provided.

What is claimed is:

1. A telephoto lens system allowing a short-distance photographing operation, comprising, in order from an object side:
   a first lens group which has a positive refracting power and is movable for a focusing operation;
   a second lens group which has a positive refracting power and is fixed in position in the focusing operation;
   a third lens group which has a negative refracting power and is movable for the focusing operation; and
   a fourth lens group which has a positive refracting power and is fixed in position in the focusing operation,
   wherein in a focusing operation from infinity to a short distance, said first lens group is moved toward the object side along a convex nonlinear path to change a group interval from said second lens group, and said third lens group is moved to increase a group interval from said second lens group.

2. A telephoto lens system according to claim 1, wherein when a focal length of said first lens group is represented by $f_1$, and a focal length of said second lens group is represented by $f_2$, said first and second lens groups are arranged to satisfy:

$1 < f_2/f_1 < 3$.

3. A telephoto lens system according to claim 1, wherein said first lens group has a negative lens at a most object side, and when a focal length of said first lens group is represented by $f_1$, and a focal length of said negative lens in said first lens group is represented by $f_A$, said first lens group is arranged to satisfy:

$-3 < f_A/f_1 < -1.4$.

4. A telephoto lens system according to claim 1, wherein said third lens group consists of a plurality of lenses including a doublet negative lens, and is arranged to satisfy:

$0.5 < r_a/\{F(n_b - n_a)\} < 1.0$ where
   F: the focal length of the entire system in an infinity arrangement
   $r_a$: the radius of curvature of each of adjacent lens surfaces of lenses constituting said doublet negative lens at a most object side in said third lens group
   $n_a$: the refractive index of an object-side lens constituting a portion of said doublet negative lens at the most object side in said third lens group
   $n_b$: the refractive index of an image-side lens constituting another portion of said doublet negative lens at the most object side in said third lens group.

5. A telephoto lens system according to claim 1, wherein said fourth lens group consists of a plurality of lenses including a doublet positive lens, and is arranged to satisfy:

$-7 < r_b/\{F(n_d - n_c)\} < -2$ where
   F: the focal length of the entire system in an infinity arrangement
   $r_b$: the radius of curvature of each of adjacent lens surfaces of lenses constituting said doublet positive lens in said fourth lens group
   $n_c$: the refractive index of an object-side lens constituting a portion of said doublet positive lens in said fourth lens group
   $n_d$: the refractive index of an image-side lens constituting another portion of said doublet positive lens in said fourth lens group.

6. A telephoto lens system according to claim 1, wherein said fourth lens group consists of a plurality of lenses including a doublet positive lens, and when an axial air interval between said doublet positive lens in said fourth lens group and a lens located at an image side of said doublet positive lens is represented by $D_A$, and a focal length of the entire system in an infinity arrangement is represented by F, said fourth lens group is arranged to satisfy:

$0.05 < D_A/F < 0.35$.

7. A telephoto lens system according to claim 1, wherein when a synthesized focal length of said first and second lens groups in an infinity arrangement is represented by $f_{1,2}$, and a focal length of said third lens group is represented by $f_3$, said first and second lens groups and said third lens group are arranged to satisfy:

$1.3 < f_{1,2}/|f_3| < 2.2$.

8. A telephoto lens system according to claim 1, wherein when a focal length of said third lens group is represented by $f_3$, and a focal length of said fourth lens group is represented by $f_4$, said third and fourth lens groups are arranged to satisfy:

$1.5 < f_4/|f_3| < 2.7$.

9. A telephoto lens system according to claim 1, wherein when a focal length of said first lens group is represented by $f_1$, a focal length of said second lens group is represented by $f_2$, a synthesized focal length of said first and second lens groups in an infinity arrangement is represented by $f_{1,2}$, a focal length of said third lens group is represented by $f_3$, and a focal length of said fourth lens group is represented by $f_4$, said first, second, third, and fourth lens groups are arranged to satisfy:

$1 < f_2/f_1 < 3$ $1.3 < f_{1,2}/|f_3| < 2.2$ $1.5 < f_4/|f_3| < 2.7$.

10. A telephoto lens system according to claim 1, wherein said third lens group consists of a plurality of lenses including a doublet negative lens, said fourth lens group consists of a plurality of lenses including a doublet positive lens, and said third and fourth lens groups are arranged to satisfy:

$0.5 < r_a/\{F(n_b - n_a)\} < 1.0$ $-7 < r_b/\{F(n_d - n_c)\} < -2$ $0.05 < D_A/F < 0.35$ where F: the focal length of the entire system in an infinity arrangement $r_a$: the radius of curvature of each of adjacent lens surfaces of lenses constituting said doublet negative lens at a most object side in said third lens group $r_b$: the radius of curvature of each of adjacent lens surfaces of lenses constituting said doublet positive lens in said fourth lens group $n_a$: the refractive index of an object-side lens constituting a portion of said doublet negative lens at the most object side in said third lens group $n_b$: the refractive index of an image-side lens constituting another portion of said doublet negative lens at the most object side in said third lens group $n_c$: the refractive index of an object-side lens constituting a portion of said doublet positive lens in said fourth lens group $n_d$: the refractive index of an image-side lens constituting another portion of said doublet positive lens in said fourth lens group $D_A$: the axial air interval between said doublet positive lens in said fourth lens group and a lens located at an image side of said doublet positive lens.

11. A telephoto lens system according to claim 1, wherein said first lens group includes at least one negative lens and at least one positive lens and has a positive refracting power as a whole, said second lens group consists of a doublet positive lens having negative and positive lenses, said third lens group consists of a plurality of negative and positive lenses including a doublet negative lens and has a negative refracting power as a whole, and said fourth lens group consists of a doublet positive lens having negative and positive lenses, a negative lens, and a positive lens and has a positive refracting power as a whole.

12. A telephoto lens system according to claim 11, wherein, in order from the object side, said first lens group consists of a doublet positive lens having a negative meniscus lens with a convex surface facing the object side and a double-convex positive lens, and a positive meniscus lens with a convex surface facing the object side, said second lens group consists of a doublet positive lens having a negative meniscus lens with a convex surface facing the object side and a positive meniscus lens with a convex surface facing the object side, said third lens group consists of a meniscus-shaped doublet negative lens having a negative meniscus lens with a convex surface facing the object side and a positive meniscus lens with a convex surface facing the object side, and a double-concave-shaped doublet negative lens having a positive meniscus lens with a convex surface facing an image side and a double-concave negative lens, and said fourth lens group consists of a doublet positive lens having a negative meniscus lens with a convex surface facing the object side and a double-convex positive lens, a negative meniscus lens with a convex surface facing the image side, and a positive meniscus lens with a convex surface facing the object side.

13. A telephoto lens system according to claim 11, wherein, in order from the object side, said first lens group consists of a doublet positive lens having a negative meniscus lens with a convex surface facing the object side and a double-convex positive lens, and a positive meniscus lens with a convex surface facing the object side, said second lens group consists of a doublet positive lens having a negative meniscus lens with a convex surface facing the object side and a positive meniscus lens with a convex surface facing the object side, said third lens group consists of a meniscus-shaped doublet negative lens having a negative meniscus lens with a convex surface facing the object side and a positive meniscus lens with a convex surface facing the object side, and a double-concave-shaped doublet negative lens having a positive meniscus lens with a convex surface facing an image side and a double-concave negative lens, and said fourth lens group consists of a doublet positive lens having a double-concave negative lens and a double-convex positive lens, a double-concave negative lens, and a double-convex positive lens.

14. A telephoto lens system according to claim 1, wherein said lens system is arranged according to data in the following table:

| f = 200.0 mm, f-number: 4.0, 2ω = 12.33° | | | | | |
|---|---|---|---|---|---|
| | r | d | ν | n | |
| 1 | 197.971 | 2.50 | 33.9 | 1.80384 | $L_1$ |
| 2 | 85.604 | 7.00 | 82.6 | 1.49782 | |
| 3 | −206.085 | 0.30 | | | |
| 4 | 71.626 | 6.00 | 82.6 | 1.49782 | $L_2$ |
| 5 | 432.817 | 6.64 | | | |
| 6 | 79.137 | 2.50 | 40.9 | 1.79631 | $L_3$ |
| 7 | 39.959 | 8.80 | 60.7 | 1.60311 | |
| 8 | 484.258 | 5.14 | | | |
| 9 | 196.475 | 2.00 | 57.0 | 1.62280 | $L_4$ |
| 10 | 31.414 | 5.00 | 33.9 | 1.80384 | |
| 11 | 62.330 | 3.70 | | | |
| 12 | −105.523 | 4.00 | 25.4 | 1.80518 | $L_5$ |
| 13 | −59.020 | 2.00 | 60.1 | 1.62041 | |
| 14 | 49.151 | 45.12 | | | |
| 15 | 1213.454 | 2.00 | 31.1 | 1.68893 | $L_6$ |
| 16 | 69.615 | 6.00 | 60.1 | 1.62041 | |
| 17 | −59.143 | 46.50 | | | |
| 18 | −72.715 | 2.50 | 49.4 | 1.77279 | $L_7$ |
| 19 | −436.246 | 0.40 | | | |
| 20 | 86.920 | 6.00 | 45.9 | 1.54814 | $L_8$ |
| 21 | 815.561 | (Bf) | | | |

(Variable Interval in Zooming)

| f = 200.1499 | β = −0.5000 | β = −1.0000 |
|---|---|---|
| $d_0$  0.0000 | 480.7237 | 272.5885 |
| $d_5$  6.6432 | 14.2044 | 6.6432 |

-continued

| f = 200.0 mm, f-number: 4.0, 2ω = 12.33° | | | |
|---|---|---|---|
| $d_8$ | 5.1405 | 17.7426 | 37.1142 |
| $d_{14}$ | 45.1242 | 32.5222 | 13.1506 |
| Bf | 58.9638 | 58.9638 | 58.9638 |

Condition correspondence numeral values are as follows:

(1) $f_2/f_1 = 2.12$
(2) $f_4/f_1 = -1.65$
(3) $r_a/\{F(n_b - n_a)\} = 0.87$
(4) $r_b/\{F(n_d - n_c)\} = -5.08$
(5) $D_A/F = 0.23$
(6) $f_{1,2}/|f_3| = 1.67$
(7) $f_4/|f_3| = 2.50$ where a numeral in a leftmost column indicates an order from the object side, r is the radius of curvature of a lens surface, d is the lens surface interval, v is the Abbe's number, n is the refracting power for a d-line (λ=587.6 nm), 2ω is the field angle, β is the photographing magnification, Bf is the back focus, and $d_0$ is the distance from the object to an apex of a first lens surface, $f_1$: the focal length of said first lens group
$f_2$: the focal length of said second lens group
$f_4$: the focal length of a negative lens located at a most object side in said first lens group
F: the focal length of the entire system in an infinity arrangement
$r_a$: the radius of curvature of each of adjacent lens surfaces of lenses constituting a doublet lens at the most object side in said third lens group
$n_a$: the refractive index of an object-side lens constituting a portion of said doublet lens at the most object side in said third lens group
$n_b$: the refractive index of an image-side lens constituting another portion of said doublet lens at the most object side in said third lens group
$r_b$: the radius of curvature of each of adjacent lens surfaces of lenses constituting a doublet lens in said fourth lens group
$n_c$: the refractive index of an object-side lens constituting a portion of said doublet lens in said fourth lens group
$n_d$: the refractive index of an image-side lens constituting another portion of said doublet lens in said fourth lens group
$f_{1,2}$: the synthesized focal length of said first and second lens groups in the infinity arrangement
$f_3$: the focal length of said third lens group
$f_4$: the focal length of said fourth lens group.

15. A telephoto lens system according to claim 1, wherein said lens system is arranged according to data in the following table:

| f = 200.00 mm, f-number: 4.0, 2ω = 12.33° | | | | | |
|---|---|---|---|---|---|
| | r | d | v | n | |
| 1 | 219.515 | 2.50 | 33.9 | 1.80384 | $L_1$ |
| 2 | 95.411 | 7.00 | 82.6 | 1.49782 | |
| 3 | −215.817 | 0.30 | | | |
| 4 | 72.028 | 6.00 | 82.6 | 1.49782 | $L_2$ |
| 5 | 515.631 | 1.00 | | | |
| 6 | 82.825 | 2.50 | 39.8 | 1.86994 | $L_3$ |
| 7 | 39.674 | 8.00 | 55.6 | 1.69680 | |
| 8 | 229.416 | 5.99 | | | |
| 9 | 118.583 | 2.00 | 54.0 | 1.61720 | $L_4$ |
| 10 | 29.047 | 5.00 | 33.9 | 1.80384 | |
| 11 | 57.872 | 4.00 | | | |
| 12 | −123.385 | 4.00 | 33.9 | 1.80384 | $L_5$ |
| 13 | −62.418 | 3.00 | 60.0 | 1.64000 | |
| 14 | 46.398 | 39.63 | | | |
| 15 | −17676.956 | 2.00 | 32.2 | 1.67270 | $L_6$ |
| 16 | 87.569 | 6.00 | 65.4 | 1.60300 | |
| 17 | −56.202 | 41.50 | | | |
| 18 | −61.913 | 2.50 | 52.3 | 1.74810 | $L_7$ |
| 19 | 7559.136 | 0.40 | | | |
| 20 | 111.209 | 6.00 | 49.0 | 1.53172 | $L_8$ |
| 21 | −121.521 | (Bf) | | | |

(Variable Interval in Zooming)

| f = 199.9915 | β = −0.5000 | β = −1.0000 |
|---|---|---|
| $d_0$ 0.0000 | 483.5721 | 278.4238 |
| $d_5$ 0.9970 | 6.7871 | 0.9970 |
| $d_8$ 5.9902 | 20.4654 | 40.6025 |
| $d_{14}$ 39.6330 | 25.1578 | 5.0208 |
| Bf 70.5371 | 70.5371 | 70.5371 |

Condition correspondence numeral values are as follows:

(1) $f_2/f_1 = 2.64$
(2) $f_4/f_1 = -1.82$
(3) $r_a/\{F(n_b - n_a)\} = 0.78$
(4) $r_b/\{F(n_d - n_c)\} = -6.28$
(5) $D_A/F = 0.21$
(6) $f_{1,2}/|f_3| = 1.60$
(7) $f_4/|f_3| = 2.40$ where a numeral in a leftmost column indicates an order from the object side, r is the radius of curvature of a lens surface, d is the lens surface interval, v is the Abbe's number, n is the refracting power for a d-line (λ=587.6 nm), 2ω is the field angle, β is the photographing magnification, Bf is the back focus, and $d_0$ is the distance from the object to an apex of a first lens surface, $f_1$: the focal length of said first lens group
$f_2$: the focal length of said second lens group
$f_4$: the focal length of a negative lens located at a most object side in said first lens group
F: the focal length of the entire system in an infinity arrangement
$r_a$: the radius of curvature of each of adjacent lens surfaces of lenses constituting a doublet lens at the most object side in said third lens group
$n_a$: the refractive index of an object-side lens constituting a portion of said doublet lens at the most object side in said third lens group
$n_b$: the refractive index of an image-side lens constituting another portion of said doublet lens at the most object side in said third lens group
$r_b$: the radius of curvature of each of adjacent lens surfaces of lenses constituting a doublet lens in said fourth lens group
$n_c$: the refractive index of an object-side lens constituting a portion of said doublet lens in said fourth lens group
$n_d$: the refractive index of an image-side lens constituting another portion of said doublet lens in said fourth lens group
$f_{1,2}$: the synthesized focal length of said first and second lens groups in the infinity arrangement
$f_3$: the focal length of said third lens group
$f_4$: the focal length of said fourth lens group.

16. A telephoto lens system allowing a short-distance photographing operation, comprising, in order from an object side:

a first lens group which has a positive refracting power and is movable for a focusing operation;

a second lens group which has a positive refracting power and is fixed in position in the focusing operation;

a third lens group which has a negative refracting power and is movable for the focusing operation; and a fourth lens group which has a positive refracting power and is fixed in position in the focusing operation, wherein in a focusing operation from infinity to a short distance, said first lens group is moved toward the object side to change a group interval from said second lens group, and said third lens group is moved to increase a group interval from said second lens group.

17. A telephoto lens system according to claim 16, wherein said first lens group has a negative lens and when a focal length of said first lens group is represented by $f_1$, and a focal length of said negative lens in said first lens group is represented by $f_A$, said first lens group is arranged to satisfy:

$$-3 < f_A/f_1 < -1.4.$$

* * * * *